(12) United States Patent
Wang et al.

(10) Patent No.: US 10,119,001 B2
(45) Date of Patent: *Nov. 6, 2018

(54) EXTENDED ROOM TEMPERATURE STORAGE OF EPOXY RESINS

(71) Applicants: Hexcel Corporation, Dublin, CA (US); Hexcel Composites Limited, Cambridge (GB)

(72) Inventors: Yen-Seine Wang, San Ramon, CA (US); Chris Mason, Cambridge (GB); Martin Simmons, Cambridge (GB)

(73) Assignees: HEXCEL CORPORATION, Dublin, CA (US); HEXCEL COMPOSITES LIMITED, Duxford (GB)

( * ) Notice: Subject to any disclaimer, the term of this patent is extended or adjusted under 35 U.S.C. 154(b) by 106 days.

This patent is subject to a terminal disclaimer.

(21) Appl. No.: 15/229,067

(22) Filed: Aug. 4, 2016

(65) Prior Publication Data

US 2016/0362528 A1 Dec. 15, 2016

Related U.S. Application Data

(63) Continuation-in-part of application No. PCT/EP2015/052534, filed on Feb. 6, 2015, and a
(Continued)

(30) Foreign Application Priority Data

Feb. 6, 2014 (GB) .................................. 1402053.1

(51) Int. Cl.
*C08J 5/24* (2006.01)
*C08L 77/02* (2006.01)
(Continued)

(52) U.S. Cl.
CPC ................ *C08J 5/24* (2013.01); *C08G 59/32* (2013.01); *C08G 59/5033* (2013.01); *C08K 5/18* (2013.01);
(Continued)

(58) Field of Classification Search
None
See application file for complete search history.

(56) References Cited

U.S. PATENT DOCUMENTS 4,661,559 A     4/1987   Gardner et al.
5,026,872 A *   6/1991   Kohli .................... C07C 217/70
                                                                                    548/521

(Continued)

FOREIGN PATENT DOCUMENTS

CA         2088193 A1    7/1993
EP         0132853 A1    2/1985
(Continued)

OTHER PUBLICATIONS

Jahromi et al. "Liquid Crystalline Epoxide Thermosets," Mol. Cryst. Liq. Cryst., 1994, vol. 250, pp. 209-222. (Year: 1994).*
(Continued)

*Primary Examiner* — Randy P Gulakowski
*Assistant Examiner* — Ha S Nguyen
(74) *Attorney, Agent, or Firm* — W. Mark Bielawski; David J. Oldenkamp (57) ABSTRACT

Uncured epoxy resin for use in making prepreg for aerospace applications. The resin includes an epoxy resin component comprising difunctional epoxy resin, trifunctional epoxy resin and/or tetrafunctional epoxy resin and a sufficient amount of [3-(4-aminobenzoyl) oxyphenyl]4-aminobenzoate (3-ABOAB), as a curing agent, such that the uncured resin can be stored at room temperature of at least 6 weeks and wherein the uncured resin can be fully cured in
(Continued)

no more than 2 hours at a temperature of between 175° C. and 185° C.

20 Claims, 1 Drawing Sheet

Related U.S. Application Data continuation-in-part of application No. 14/200,074, filed on Mar. 7, 2014, now abandoned.

(51) Int. Cl.
 *C08G 59/50*   (2006.01)
 *C08L 63/00*   (2006.01)
 *C08L 81/06*   (2006.01)
 *C08G 59/32*   (2006.01)
 *C08K 5/18*   (2006.01)

(52) U.S. Cl.
 CPC ............ *C08L 63/00* (2013.01); *C08L 77/02* (2013.01); *C08L 81/06* (2013.01); *C08J 2363/00* (2013.01); *C08J 2477/00* (2013.01); *C08J 2481/06* (2013.01)

(56) References Cited

U.S. PATENT DOCUMENTS

| | | | |
|---|---|---|---|
| 7,754,322 B2 | 7/2010 | Tilbrook et al. | |
| 2010/0229517 A1* | 9/2010 | Fujihara | D01D 5/04 55/527 |
| 2011/0305863 A1 | 12/2011 | Morooka | |
| 2012/0088863 A1 | 4/2012 | Wang | |
| 2012/0088864 A1* | 4/2012 | Wang | C08L 63/00 523/435 |
| 2012/0097435 A1 | 4/2012 | Goshima et al. | |

FOREIGN PATENT DOCUMENTS

| | | |
|---|---|---|
| EP | 0133281 A2 | 2/1985 |
| EP | 2426557 A1 | 3/2012 |
| WO | 2011/083329 A2 | 7/2011 |

OTHER PUBLICATIONS

Product Sheet—Mitsui Chemicals America, Inc, "New Aromatic Diamines for use in Polyimide and Polyamide applicationss", pp. 1-3, Dec. 18, 2013.

Jahromi et al. "Liquid Crystalline Epoxide Thermosets", Mol. Cryst. Liq. Cryst., 1994, vol. 250, pp. 209-222.

* cited by examiner

EXTENDED ROOM TEMPERATURE STORAGE OF EPOXY RESINS

This application is a continuation-in-part of U.S. Ser. No. 14/200,074, which was filed on Mar. 7, 2014 and this application is a continuation-in-part of PCT/EP2015/052534, which was filed on Feb. 6, 2015.

BACKGROUND OF THE INVENTION

1. Field of the Invention

The present invention relates generally to epoxy resins and particularly to epoxy resins that are toughened with thermoplastic materials. Thermoplastic-toughened epoxy resins are used to make high performance composite parts. More particularly, the present invention is directed to increasing the out-time or shelf-life of epoxy resins when they are stored at room temperature without adversely affecting the cure rate of the resins when they are cured at conventional curing temperatures.

2. Description of Related Art

Composite materials are typically composed of a resin matrix and reinforcing fibers as the two primary constituents. Resin matrices that contain one or more epoxy resins as a principal ingredient are widely used. The composite materials are often required to perform in demanding environments, such as in the field of aerospace where the physical limits and characteristics of composite parts are of critical importance.

Pre-impregnated composite material (prepreg is used widely in the manufacture of composite parts. Prepreg is a combination of uncured resin and fiber reinforcement, which is in a form that is ready for molding and curing into the final composite part. By pre-impregnating the fiber reinforcement with resin, the manufacturer can carefully control the amount and location of resin that is impregnated into the fiber network and insure that the resin is distributed in the network as desired. It is well known that the relative amount of fibers and resin in a composite part and the distribution of resin within the fiber network have a large effect on the structural properties of the part. Prepreg is a preferred material for use in manufacturing load-bearing or structural parts and particularly aerospace structural parts, such as wings, fuselages, bulkheads and control surfaces. It is important that these parts have sufficient strength, damage tolerance, interlaminar fracture toughness and other requirements that are routinely established for such parts.

The fiber reinforcements that are commonly used in aerospace prepreg are multidirectional woven fabrics or unidirectional tape that contains fibers extending parallel to each other. The fibers are typically in the form of bundles of numerous individual fibers or filaments that are referred to as a "tows". The fibers or tows can also be chopped and randomly oriented in the resin to form a non-woven mat. These various fiber reinforcement configurations are impregnated with a carefully controlled amount of uncured resin. The resulting prepreg is typically placed between protective layers and rolled up for storage or transport to the manufacturing facility.

Prepreg may also be in the form of short segments of chopped unidirectional tape that are randomly oriented to form a non-woven mat of chopped unidirectional tape. This type of prepreg is referred to as a "quasi-isotropic chopped" prepreg. Quasi-isotropic chopped prepreg is similar to the more traditional non-woven fiber mat prepreg, except that short lengths of chopped unidirectional tape (chips) are randomly oriented in the mat rather than chopped fibers.

The tensile strength of a cured composite material is largely dictated by the individual properties of the reinforcing fiber and matrix resin, as well as the interaction between these two components. In addition, the fiber-resin volume ratio is an important factor. Cured composites that are under tension tend to fail through a mechanism of accumulated damage arising from multiple tensile breakages of the individual fiber filaments located in the reinforcement tows. Once the stress levels in the resin adjacent to the broken filament ends becomes too great, the whole composite can fail. Therefore, fiber strength, the strength of the resin matrix, and the efficiency of stress dissipation in the vicinity of broken filament ends all contribute to the tensile strength of a cured composite material.

In many applications, it is desirable to maximize the tensile strength property of the cured composite material. However, attempts to maximize tensile strength can often result in negative effects on other desirable properties, such as the compression performance and damage tolerance. In addition, attempts to maximize tensile strength can have unpredictable effects on the viscosity, tack and out-time of the resin matrix.

One method of increasing composite tensile performance and resistance to damage is to include one or more thermoplastic materials in the epoxy resin matrix. A variety of different thermoplastic materials in a variety of different forms have been used to toughen epoxy resins. For example, see U.S. Pat. No. 7,754,322.

Multiple layers of prepreg are commonly used to form composite parts for structural applications that have a laminated structure. Delamination of such composite parts is also a possible failure mode. Delamination occurs when two layers de-bond from each other. Important design limiting factors include both the energy needed to initiate a delamination and the energy needed to propagate it. The initiation and growth of a delamination is often determined by examining Mode I and Mode II fracture toughness. Fracture toughness is usually measured using composite materials that have a unidirectional fiber orientation. The interlaminar fracture toughness of a composite material is quantified using the G1c (Double Cantilever Beam) and G2c (End Notch Flex) tests. In Mode I, the pre-cracked laminate failure is governed by peel forces and in Mode II the crack is propagated by shear forces. The G2c interlaminar fracture toughness is related to the laminates ability to compress when impacted. This compressive property is measured as the compression of the laminate after a designated impact (CAI). Prepreg materials that exhibit high damage tolerances also tend have high CAI and G2c values.

The viscosity of the uncured resin is an important factor that must be taken into consideration when forming prepreg or when the resin is used in a molding process. The viscosity of the resin must be low enough to insure that the resin components can be mixed completely and then impregnated thoroughly into the reinforcing fibers. The viscosity of the resin must also be high enough to insure that the resin does not flow to any substantial degree during storage or lay-up of the prepreg. Resins that do not have viscosities which meet these basic requirements cannot be used to make prepreg. The viscosity of the uncured resin must remain within acceptable limits during storage in order for the cured composite part to exhibit desired levels of strength and/or damage tolerance.

The stickiness or tackiness of the uncured prepreg is commonly referred to as "tack". The tack of uncured prepreg is an important consideration during lay-up and molding operations. Prepreg with little or no tack is difficult to form into laminates that can be molded to form composite parts. Conversely, prepreg with too much tack can be difficult to handle and also difficult to place into the mold. It is desirable that the prepreg have the right amount of tack to insure easy handling and good laminate/molding characteristics. It is important that the tack of the uncured resin and prepreg remain within acceptable limits during storage and handling to insure that desired levels of strength and/or damage tolerance can be obtained for a given cured composite.

The "out-time" or "shelf-life" of uncured resin is the length of time that the resin may be exposed to ambient conditions before undergoing an unacceptable degree of curing which can adversely affect important resin properties, such as viscosity and tack. The out-time of epoxy resin at room temperature can vary widely depending upon a variety of factors, but is principally controlled by the resin formulation being used and particularly by the types and amounts of curative agents that are included in the resin. The resin out-time must be sufficiently long to allow storage, transport, normal handling, lay-up and molding operations to be accomplished without the resin undergoing unacceptable levels of curing.

The amounts and types of curative agents must also be such that the uncured resin can be cured according to the curing processes that are typically used to make thermoplastic toughened epoxy composite parts. Typical curing processes for thermoplastic-toughened epoxy resins that are used to make structural parts involve heating under pressure at a temperature of between 175° C. and 185° C. for at least two hours. This requirement that the uncured resin exhibit suitable curing properties at conventional curing temperatures has a direct effect on ones ability to extend room temperature out-time of the uncured resin. In general, the current thermoplastic toughened epoxy resins, which are cured at about 177° C., have a shelf-life at room temperature of a maximum of 2 to 3 weeks.

It would be desirable to provide a thermoplastic toughened epoxy resin that exhibits all of the structural properties that are expected from such toughened resins systems, but which can be stored at room temperature for periods of up to 6 weeks or more and then cured under conventional curing conditions for such thermoplastic toughened epoxy resins.

SUMMARY OF THE INVENTION

In accordance with the present invention uncured resins are provided that are suitable for use in aerospace applications where high levels of strength, damage tolerance and interlaminar toughness are required. The invention is applicable to epoxy resins in general and in particular to epoxy resins that are toughened with one or more thermoplastic materials and cured with a conventional diamine curing agent, such as 3,3'-diaminodiphenyl sulphone (3,3'-DDS) and/or 4,4'-diaminodiphenyl sulphone (4,4'-DDS).

It was discovered that using [3-(4-aminobenzoyl) oxyphenyl]4-aminobenzoate (3-ABOAB) in place of 3,3'-DDS or 4,4'-DDS as the curing agent causes a significant decrease in the reactivity of the thermoplastic toughened epoxy resin at room temperature. As a result, the shelf-life of thermoplastic toughened epoxy resins at room temperature can be extended out to 6 weeks or more. It was further discovered that the low room temperature reactivity of 3-ABOAB does not prevent adequate curing at temperatures between 165° C. and 190° C. to form cured composite parts that have structural properties in line with those expected for thermoplastic toughened epoxy resin composites.

The present invention covers uncured resins that include an epoxy resin component made up of a trifunctional epoxy resin that may be combined with tetrafunctional and difunctional epoxies. The uncured resin further includes a sufficient amount of 3-ABOAB as the curing agent such that the heat release of the uncured resin remains substantially constant for a period of up to 6 weeks when said uncured resin is stored at room temperature. The preferred uncured resin includes a thermoplastic component. The invention also covers the uncured resin in combination with a fiber reinforcement as well as the cured combinations of resin and fiber reinforcement that are suitable for use as at least part of a primary structure of an aircraft.

Prepreg and the methods for making prepreg using 3-ABOAB-cured thermoplastic-toughened epoxy resins are also part of the present invention. The prepreg is suitable for use in fabricating cured composite parts that are suitable for use as at least part of a primary structure of an aircraft.

The above described and many other features and attendant advantages of the present invention will become better understood by reference to the following detailed description when taken in conjunction with the accompanying drawings.

DETAILED DESCRIPTION OF THE INVENTION

Uncured resin compositions in accordance with the present invention may be used in a vide variety of situations where an epoxy resin, preferably one that is toughened with thermoplastic, is desired. Although the uncured epoxy resin compositions may be used alone, the compositions are generally combined with a fibrous support to form composite materials. The composite materials may be in the font of a prepreg, partially cured prepreg or a completely cured final part.

Although the composite materials may be used for any intended purpose, they are preferably used in aerospace vehicles and particularly preferred for use in civilian and military aircraft. For example, the composite materials may be used to make non-primary (secondary) aircraft structures. However the preferred use of the composite material is for structural applications, such as primary aircraft structures. Primary aircraft structures or parts are those elements of either fixed-wing or rotary wing aircraft that undergo significant stress during flight and which are essential for the aircraft to maintain controlled flight. The composite materials may also be used for other structural applications to make load-bearing parts and structures in general.

Figure 1:
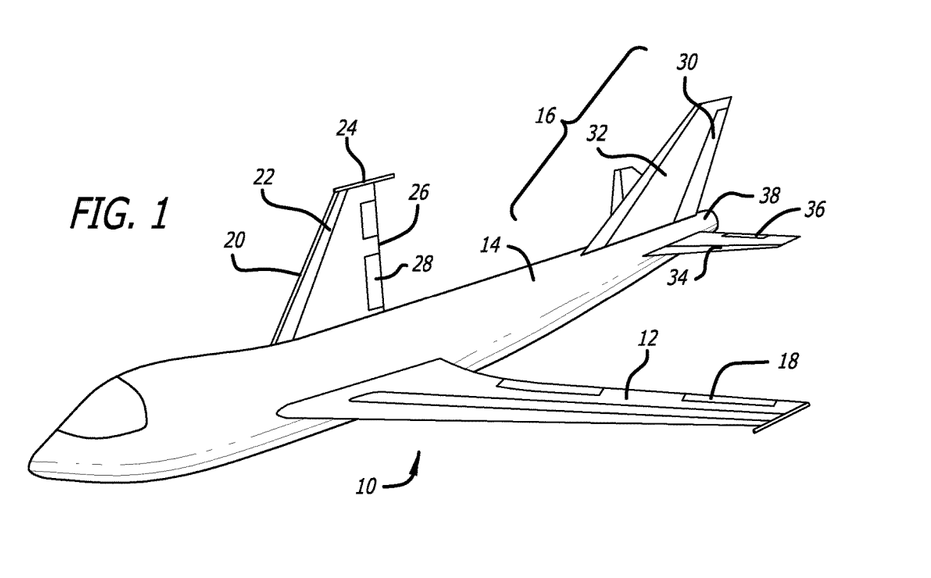
FIG. 1 is a perspective view of an aircraft, which depicts exemplary primary aircraft structures that can be made using composite materials in accordance with the present invention.
Figure 2:
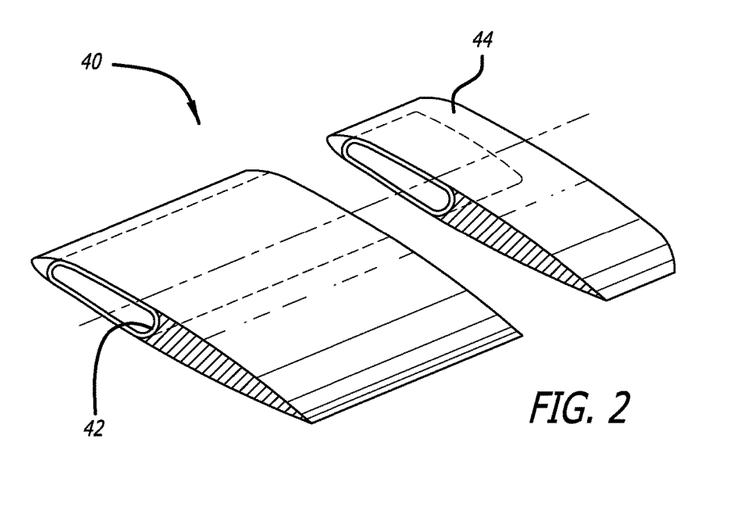
FIG. 2 is a partial view of a helicopter rotor blade, which depicts exemplary primary aircraft structures that can be made using composite materials in accordance with the present invention.

FIG. 1 depicts a fixed-wing aircraft at 10 that includes a number of exemplary primary aircraft structures and parts that may be made using composite materials in accordance with the present invention. The exemplary primary parts or structures include the wing 12, fuselage 14 and tail assembly 16. The wing 12 includes a number of exemplary primary aircraft parts, such as ailerons 18, leading edge 20, wing slats 22, spoilers 24 trailing edge 26 and trailing edge flaps 28. The tail assembly 16 also includes a number of exemplary primary parts, such as rudder 30, fin 32, horizontal stabilizer 34, elevators 36 and tail 38. FIG. 2 depicts the outer end portions of a helicopter rotor blade 40 which includes a spar 42 and outer surface 44 as primary aircraft structures. Other exemplary primary aircraft structures include wing spars, and a variety of flanges, clips and connectors that connect primary parts together to form primary structures.

The uncured resin and pre-impregnated composite materials (prepreg) of the present invention may be used as replacements for existing uncured resin and/or prepreg that are being used to form composite parts in the aerospace industry and in any other structural applications where high strength and damage tolerance is required. The invention involves substituting the resin formulations of the present invention in place of existing resins that are being used to make prepreg. Accordingly, the resin formulations of the present invention are suitable for use in any of the conventional prepreg manufacturing and curing processes that are suitable for thermoplastic-toughened epoxy resins.

Pre-impregnated composite materials in accordance with the present invention are composed of reinforcing fibers and an uncured resin matrix. The reinforcing fibers can be any of the conventional fiber configurations that are used in the prepreg industry. The uncured resin matrix may include one or more epoxy resins that are difunctional, trifunctional or tetrafunctional. It is preferred that the epoxy resin component of the uncured resin include a trifunctional epoxy resin. The epoxy resin component may also include one or more tetrafunctional epoxies and or one or more difunctional epoxies. Preferred epoxy resin components are those that include difunctional epoxy, trifunctional epoxy and tetrafunctional epoxy. The uncured resin preferably further includes a thermoplastic component. As a feature of the invention, [3-(4-aminobenzoyl) oxyphenyl]4-aminobenzoate (3-ABOAB) is used as the curing agent. The chemical structure for 3-ABOAB is set forth below.

As will be discussed in detail below, the present invention involves the discovery that the use of 3-ABOAB to cure thermoplastic-toughened epoxy resins allows one to store the resin at room temperature for relatively long periods of time without adversely affecting the ability of the resin to be cured at conventional curing, temperatures of between 165° C. and 190° C.

The epoxy resin component is preferably composed of one or more trifunctional epoxy resins. The epoxy resin component may also include tetrafunctional epoxy resins and or difunctional epoxy resins. Preferred is a combination of trifunctional, tetrafunctional and difunctional epoxy resins. The multifunctional epoxy resins may be saturated, unsaturated, cylcoaliphatic, alicyclic or heterocyclic. Suitable multifunctional epoxy, resins, by way of example, include those based upon: phenol and cresol epoxy novolacs, glycidyl ethers of phenol-aldelyde adducts; glycidyl ethers of dialiphatic diols; diglycidyl ether; diethylene glycol diglycidyl ether; aromatic epoxy resins; dialiphatic triglycidyl ethers, aliphatic polyglycidyl ethers; epoxidised olefins; brominated resins; aromatic glycidyl amines; heterocyclic glycidyl imidines and amides; glycidyl ethers; fluorinated epoxy resins or any combination thereof. The epoxy resin component should make up from 40 to 65 weight percent of the matrix resin.

A trifunctional epoxy resin will be understood as having the three epoxy groups substituted either directly or indirectly in a para or meta orientation on the phenyl ring in the backbone of the compound. A tetrafunctional epoxy resin will be understood as having the four epoxy groups substituted either directly or indirectly in a meta or para orientation on the phenyl ring in the backbone of the compound.

The phenyl ring may additionally be substituted with other suitable non-epoxy substituent groups. Suitable substituent groups, by way of example, include hydrogen, hydroxyl, alkyl alkenyl, alkynyl, alkoxyl, aryl, aryloxyl, aralkyloxyl, aralkyl, halo, nitro, or cyano radicals. Suitable non-epoxy substituent groups may be bonded to the phenyl ring at the para or ortho positions, or bonded at a meta position not occupied by an epoxy group. Suitable tetrafunctional epoxy resins include N,N,N',N'-tetraglycidyl-m-xylenediamine (available commercially from Mitsubishi Gas Chemical Company (Chiyoda-Ku, Tokyo, Japan) under the name Tetrad-X), and Erisys GA-240 (from CVC Chemicals, Morristown, N.J.). Suitable trifunctional epoxy resins, by way of example, include those based upon: phenol and cresol epoxy novolacs; glycidyl ethers of phenol-aldelyde adducts; aromatic epoxy resins; dialiphatic triglycidyl ethers; aliphatic polyglycidyl ethers; epoxidised olefins; brominated resins, aromatic glycidyl amines and glycidyl ethers; heterocyclic glycidyl imidines and amides; glycidyl ethers; fluorinated epoxy resins or any combination thereof.

A preferred trifunctional epoxy resin is triglycidyl meta-aminophenol. Triglycidyl meta-aminophenol is available commercially from Huntsman Advanced Materials (Monthey, Switzerland) under the trade names Araldite MY0600 or MY0610 and from Sumitomo Chemical Co. (Osaka, Japan) under the trade name ELM-120.

Additional examples of suitable multifunctional epoxy resin include N,N,N',N'-tetraglycidyl-4,4'-diaminodiphenyl methane (TGDDM available commercially as Araldite MY720 and MY72 I from Huntsman Advanced Materials (Monthey, Switzerland), or ELM 434 from Sumitomo), triglycidyl ether of para aminophenol (available commercially as Araldite MY 0500 or MY 0510 from Huntsman Advanced Materials), dicyclopentadiene based epoxy resins such as Tactix 556 (available commercially from Huntsman Advanced Materials), tris-(hydroxyl phenyl) and methane-based epoxy resin such as Tactix 742 (available commercially from Huntsman Advanced Materials). Other suitable multifunctional epoxy resins include DEN 438 (from Dow Chemicals, Midland, Mich.), DEN 439 (from Dow Chemicals), Araldite ECN 1273 (from Huntsman Advanced Materials), and Araldite ECN 1299 (from Huntsman Advanced Materials). TGDDM (MY720 or MY721) is a preferred tetrafunctional epoxy.

Difunctional epoxy resin, when used in the resin component, may be any suitable difunctional epoxy resin. It will be understood that this includes any suitable epoxy resins having two epoxy functional groups. The difunctional epoxy resin may be saturated, unsaturated, cylcoaliphatic, alicyclic or heterocyclic.

Suitable difunctional epoxy resins, by way of example, include those based on: diglycidyl ether of Bisphenol F, Bisphenol A (optionally brominated), phenol and cresol epoxy novolacs, glycidyl ethers of phenol-aldelyde adducts, glycidyl ethers of aliphatic diols, diglycidyl ether, diethylene glycol diglycidyl ether, Epikote, Epon, aromatic epoxy resins, aliphatic triglycidyl ethers, aliphatic polyglycidyl ethers, epoxidised olefins, brominated resins, aromatic glycidyl amines, heterocyclic glycidyl imidines and amides, glycidyl ethers, fluorinated epoxy resins, or any combination thereof. The difunctional epoxy resin is preferably selected from diglycidyl ether of Bisphenol F, diglycidyl ether of Bisphenol A, diglycidyl dihydroxy naphthalene, or any combination thereof. Most preferred is diglycidyl ether of Bisphenol F. Diglycidyl ether of Bisphenol F is available commercially from Huntsman Advanced Materials (Brewster, N.Y.) under the trade names Araldite GY281 and GY285.

The uncured resin of the present invention also preferably includes a thermoplastic component that includes one or more thermoplastic materials that may be soluble or insoluble in the epoxy resin. It is preferred that the thermoplastic component includes a combination of soluble and insoluble thermoplastic materials.

With respect to soluble thermoplastic materials, any suitable soluble thermoplastic polymer that has been used as toughening agent may be used. Typically, the thermoplastic polymer is added to the resin mix as particles that are dissolved in the resin mixture by heating prior to addition of the insoluble particles and curing agent. Once the thermoplastic polymer is substantially dissolved in the hot matrix resin precursor (i.e. the blend of epoxy resins), the precursor is cooled and the remaining ingredients (curing agent and insoluble thermoplastic(s)) are added.

Exemplary soluble thermoplastics that can be used alone or in combination in the thermoplastic component include: polyethersulfone, polyetherimide and polysulphone.

Polyethersulfone (PES) is preferred for use as the soluble thermoplastic component. PES is sold under the trade name Sumikaexcel 5003P, which is commercially available from Sumitomo Chemicals. Alternatives to 5003P are Solvay polyethersulphone 105RP or VW-10200RP or the non-hydroxyl terminated grades such as Solvay 1054P (Solvay Advanced Polymers-Greenville, S.C.). The molecular weight of 5003P and VW-10200RP is 46,500 g/mole. Polyetherimide is available from General Electric (Pittsfield, Mass.) under the trade name ULTEM 1000P. It is preferred that the uncured resin matrix include from 10 to 20 weight percent of the soluble thermoplastic material. More preferred is an uncured resin matrix that contains from 12 to 18 weight percent soluble thermoplastic material. Most preferred are resin matrix that contain from 13 to 15 weight percent soluble thermoplastic material.

The thermoplastic component also preferably includes insoluble thermoplastic particles. These particles do not dissolve during the curing process and remain within the interlayer zones of the cured composite material. The amount of insoluble particles in the uncured resin matrix is preferably from 5 to 30 weight percent. More preferred are resin matrices that contain from 6 to 18 weight percent insoluble particles. Most preferred are resin matrices that contain from 8 to 14 weight percent insoluble particles.

Examples of suitable thermoplastic particles include polyamideimide (PAI) particles and polyamide (PA) particles. The thermoplastic particles have glass transition temperatures ($T_g$) that are above room temperature (22° C.). Polyamide particles are preferred.

Polyamide particles come in a variety of grades that differ in the particular polyamide or polyamides present in the particle and the molecular weight and polymeric characteristics of the polyamide polymers and copolymers, such as the degree of crystallinity. It is preferred that the polyamide particles have a Young's modulus of between 150 and 400 ksi.

Suitable polyamide particles contain polyamide 6 (caprolactame-PA6), polyamide 12 (laurolactame PA12), polyamide 11 and copolymers, of these polyamides. The particles should have particle sizes of below 100 Microns. It is preferred that the particles range in size from 5 to 60 microns and more preferably from 5 to 30 microns. The particles should be substantially spherical. The particles can be made by anionic polymerization in accordance with PCT application WO2006/051222, by co-extrusion, precipitation polymerization, emulsion polymerization or by cryogenic grinding. Suitable polyamide particles are available commercially from Arkema of France under the trade names Orgasol and Rilsan.

Orgasol 1002 D NATI is an exemplary polyamide particle. Orgasol 1002 D NATI is composed of 100% PA6. The Young's modulus of Orgasol 1002 D NATI particles is about 300 ksi. The particles having a degree of crystallinity equal to 51%, a glass transition temperature (Tg) of 26° C., a density of 1.15 (ISO 1183), a molecular weight of 60,200 (g/mole) with a melting point, of 217° C. and an average particle size of 20 microns. Another example of a suitable rigid particle is Orgasol 3202 D Nat 1 which contains PA6/PA12 copolymer particles (80% PA6 and 20% PA12) having a degree of crystallinity equal to 43%, a Tg of 29° C., a density of 1.09 (ISO 1183), a molecular weight of 60,800 (g/mole) and a solution viscosity of 1.01. The polyamide copolymer particles in Orgasol 3202 D Nat 1 have an average particle size of 20 microns and a melting point of 194° C.

Other exemplary polyamide particles include GRILAMID TR55 and TR90, which are both available from EMS Chemie AG (Sumter, S.C.), GRILAMID TR55 is a polyamide having an aliphatic, cycloaliphatic and aromatic polymer backbone. TR55 has a Tg of about 160° C. and a modulus of about 320 ksi. TR 90 is a polyamide having an aliphatic and cycloaliphatic polymer backbone. TR90 has a Tg of about 155° C. and a modulus of about 230 ksi. Other suitable polyamide particles include PA11 particles that are sold by Arkema under the trade name Rilsan PA11. Further suitable polyamide particles include PA12 particles that have an average particle size of 10 microns and which are sold by KOBO Products (South Plainfield, N.J.) under the trade name SP10L.

It is preferred that the uncured resin include PA particles and that the amount of PA particles be in the range of 3 to 15 weight percent of the total resin matrix. More preferred are PA particle amounts in the range of 8-13 weight percent. It is preferred that mixtures of different types of PA particles be used. For example, mixtures of PA12 particles and PA11 particles is a preferred blend of PA particles.

Suitable PAI particles are available commercially as TORLON 4000T or TORLON 4000TF from Solvay Advanced Polymers (Alpharetta, Ga.). The average particle size range for the PAI particles is from 8 microns to 20 microns. PAI particles have a Young's modulus of about 600 ksi. The resin matrix, if desired, may include PAI particles in amounts up to 15 weight percent of the total resin matrix.

The uncured resin may also include small amounts (up to 5 weight percent of the total resin matrix) of elastic particles. Suitable elastic, particles include particles that are composed principally of polyurethane. The elastic particles preferably contain at least 95 weight percent polyurethane polymer. Other elastic particles that are composed of a high molecular weight elastomer that is insoluble in epoxy may also be used. The Young's modulus of elastic particles should be below 10 ksi. The Tg of elastic particles should be at room temperature (22° C.) or below Polyurethane particles that contain a small amount (less than 5 weight percent) of silica are a preferred type of elastic particle. Polyurethane particles that are available from Aston Chemicals (Aylesbury, UK) under the trade name SUNPU-170 are a preferred type of polyurethane particle. SUNPU-170 is composed of HDI/Trimethylol Hexyllactone Crosspolymer, Silica. The particles contain about 95 to 99 weight percent urethane polymer and 1 to 5 weight percent silica. The particles are microspheres that range in diameter from 5 microns to 20 micron. Suitable polyurethane particles are also available from Kobo Products (South Plainfield, N.J.) under the trade name BPD-500, BP-500T and BP-500W. These particles are also composed of HDI/Trimethylol hexylactone Crosspolymer and silica. The particles are also microspheres that range in size from 10 microns to 15 microns. The BPD-500 microspheres contain from 1 to 3 weight percent silica and from 97 to 99 weight percent polyurethane. Particles composed of acrylonitrile butadiene rubber, such as HYCAR 1472 (available from B.F. Goodrich), are also suitable elastic particles.

The particle sizes and relative amounts of the insoluble thermoplastic particles and elastic particles are selected so that not only are the desired levels of OHC, CAI, G1c and G2c achieved, but also so that the viscosity of the epoxy resin composition is within a range that is suitable for prepreg preparation. It is preferred that the viscosity of the resin be the same as the viscosity of existing high performance toughened resins that are presently used in the aerospace industry to make prepreg including quasi-isotropic chopped prepreg. In order to achieve the desired combination of uncured resin properties and cured composite properties in accordance with the present invention, it may be necessary to combine two or more of the above described thermoplastic materials to provide a thermoplastic component that contains more than one type of insoluble thermoplastic particle.

The amount and type of thermoplastic materials that make up the thermoplastic component are not expected to have any significant effect on the heat release properties of the uncured resin during storage at room temperature when 3-ABOAB is used as the curative. In addition, the use of various types and amounts of suitable epoxy resins is not expected to have a significant effect on the heat release properties when 3-ABOAB is used as the curative.

As a feature of the present invention, the thermoplastic-toughened epoxy is cured using [3-(4-aminobenzoyl) oxyphenyl]4-aminobenzoate (3-ABOAB) as the curing agent. Curatives described in PCT publication WO2011/083329, particularly Curing Agent I, are not suitable because they are too reactive at room temperature to produce an epoxy resin that has a shelf-life of 6 weeks at room temperature.

3-ABOAB may be synthesized using known chemical procedures for making norbomane diamines (NBDA) or it may be purchased commercially from chemical suppliers, such as Mitsui Chemicals America, Inc., under the trade name 13p-BABB. 3-ABOAB is also known as p-phenylene-bis(4-aminobezoate) or 1,3-phenylene-bis(4-aminobenzoate) (1,3-pBABB).

The amount of 3-ABOAB included in the uncured resin will depend on the amount and type of epoxy resins present in the uncured resin. The amount of 3-ABOAB should be sufficient to insure complete curing of the uncured resin while at the same time keeping the heat release of the resin at a constant and relatively low level for at least 6 weeks after the resin is made. This amount can be calculated based on the functionality and amount of each epoxy resin in the formulation. The stoichiometric ratio between 3-ABOAB and the epoxy resin(s) of the epoxy component should be between 0.65:1.0 and 1.1:0.8. The preferred stoichiometric ratio between 3-ABOAB and the epoxy resin(s) is between 0.7:1 and 0.95:1.

The amount of 3-ABOAB needed to provide complete cure at temperatures between 165° C. and 190° C. will generally be between 15 and 45 weight percent of the total uncured resin and will depend upon the functionality and amounts of epoxy resins in the epoxy component and the 3-ABOAB:epoxy stoichiometric ratio limits as set forth above. Keeping the amount of 3-ABOAB within the above stoichiomenic ratio limits also insures that the heat release remains low and constant during storage of the resin for at least 6 weeks at room temperature. The 3-ABOAB curative is added to the epoxy resins in the same mama as other conventional curing agents, such as 3,3'-DDS or 4,4'-DDS. 3-ABOAB is preferably incorporated into the uncured resin at the same time as the insoluble thermoplastic particles.

It is preferred that the only curative present in the uncured resin is 3-ABOAB. The use of catalysts, accelerators or other compounds that can increase the room temperature reactivity of the uncured resin is not suitable. No more than 5 weight percent of the total weight of the uncured resin should be in the form of a curative agent other than 3-ABOAB. Preferably, no more than 2 weight percent of the total weight of the uncured resin should be in the form of a curative agent other than 3-ABOAB.

The uncured resin may also include additional ingredients, such as performance enhancing or modifying agents and additional thermoplastic polymers provided they do not adversely affect the viscosity, tack and out life of the prepreg or the strength, damage tolerance and resistance to solvents of the cured composite part. The performance enhancing or modifying, agents, for example, may be selected from flexibilizers, additional thermoplastic polymers, core shell rubbers, flame retardants, wetting agents, pigments/dyes. UV absorbers, anti-fungal compounds, fillers, conducting particles, and viscosity modifiers. Suitable additional thermoplastic polymers include any of the following, either alone or in combination: polyether ethersulphone (PEES), polyphenyl sulphone, polyimide, aramid, polyester, polyketone, polyetheretherketone (PEEK), polyurea, polyarylether, polyarylsulphides, polycarbonates, polyphenylene oxide (PPO) and modified PPO.

Suitable fillers include, by way of example, any of the following either alone or in combination: silicas, aluminas, titania, glass, calcium carbonate and calcium oxide.

Suitable conducting particles, by way of example, include any of the following either alone or in combination: silver, gold, copper, aluminum, nickel, conducting grades of carbon, buckminsterfullerene, carbon particles, carbon nanotubes and carbon nanofibers. Metal-coated fillers may also be used, for example nickel coated carbon particles and silver coated copper particles.

The uncured resin may include, if desired, an additional non-epoxy thermosetting polymeric resin. Once cured, a thermoset resin is not suitable for melting and remolding. Suitable non-epoxy thermoset resin materials for the present invention include, but are not limited to, resins of phenol formaldehyde, urea-formaldehyde, 1,3,5-triazine-2,4,6-triamine (Melamine), bismaleimide, vinyl ester resins, benzoxazine resins, phenolic resins, polyesters, cyanate ester resins, epoxide polymers, or any combination thereof. The thermoset resin is preferably selected from epoxide resins, oyanate ester resins, bismaleimide, vinyl ester, benzoxazine and phenolic resins. If desired, the matrix may include further suitable resins containing phenolic groups, such as resorcinol based resins, and resins formed by cationic polymerization, such as DCPD-phenol copolymers. Still additional suitable resins are melamine-formaldehyde resins, and urea-formaldehyde resins. The amount of such non-epoxy thermosetting resins should be limited to 10 weight percent or less based on the total weight of the epoxy component.

The uncured resin is made in accordance with standard prepreg matrix processing. In general, the various epoxy resins are mixed together at room temperature to form a resin mix to which any soluble thermoplastic portion of the thermoplastic component is added. This mixture is then heated to a temperature above the melting point of the soluble thermoplastic(s) for a sufficient time to substantially melt time thermoplastic(s). The mixture is then cooled down to room temperature or below and the insoluble thermoplastic particle portion of the thermoplastic component, curing agent and other additives, if any, are then mixed into the resin to form the final uncured resin that is stored, as is at room temperature, or impregnated into a fiber reinforcement and stored at room temperature as a prepreg.

The uncured resin is applied to the fibrous reinforcement in accordance with any of the known prepreg manufacturing techniques. The fibrous reinforcement may be fully or partially impregnated with the uncured resin. In an alternate embodiment, the uncured resin may be applied to the fiber fibrous reinforcement as a separate film or layer, which is proximal to, and in contact with, the fibrous reinforcement, but does not substantially impregnate the fibrous reinforcement. The prepreg is typically covered on both sides with a protective film and rolled up for storage and shipment at temperatures that are typically kept well below room temperature to avoid premature curing. Any of the other prepreg manufacturing processes and storage/shipping systems may be used if desired.

The fibrous reinforcement of the prepreg may be selected from hybrid or mixed fiber systems that comprise synthetic or natural fibers, or a combination thereof. The fibrous reinforcement may preferably be selected from any suitable material such as fiberglass, carbon or aramid (aromatic polyamide) fibers. The fibrous reinforcement is preferably carbon fibers.

The fibrous reinforcement may comprise cracked (i.e. stretch-broken) or selectively discontinuous fibers, or continuous fibers. The use of cracked or selectively discontinuous fibers may facilitate lay-up of the composite material prior to being fully cured, and improve its capability of being shaped. The fibrous reinforcement may be in a woven, non-crimped, non-woven, unidirectional, or multi-axial textile structure form, such as quasi-isotropic chopped prepreg. The woven form may be selected from a plain, satin, or twill weave style. The non-crimped and multi-axial forms may have a number of plies and fiber orientations. Such styles and forms are well known in the composite reinforcement field, and are commercially available from a number of companies, including Hexcel Reinforcements (Villeurbanne, France).

The prepreg may be in the form of continuous tape, towpreg, web, or chopped lengths (chopping and slitting operations ma be carried out at any point after impregnation). The prepreg may be an adhesive or surfacing film and may additionally have embedded carriers in various forms both woven, knitted, and non-woven. The prepreg may be fully or only partially impregnated, for example, to facilitate air removal during curing.

An exemplary uncured resin is composed of from 50 to 70 weight percent triglycidyl-m-aminophenol and 30 to 50 weight percent 3-ABOAB. A preferred uncured resin is composed of from 55 to 62 weight percent triglycidyl-m-aminophenol and 38 to 45 weight percent 3-ABOAB.

Another exemplary uncured resin is composed of from 30 to 50 weight percent triglycidyl-m-aminophenol (trifunctional epoxy resin); from 9 to 15 weight percent polyethersulfone (soluble thermoplastic); from 5 to 15 weight percent polyamide particles (insoluble thermoplastic particle); and from 30 to 50 weight percent 3-ABOAB (curing, agent). Preferably, the polyamide particles are a mixture of Nylon-12 particles (SP10L) and Nylon-11 particles (Rilsan11). A preferred uncured resin is composed of from 38 to 45 weight percent triglycidyl-m-aminophenol (trifunctional epoxy resin); from 10 to 14 weight percent polyethersulfone (soluble thermoplastic); from 5 to 8 weight percent PA 12 polyamide particles; from 3 to 6 weight percent PA 11 particles; and from 33 to 37 weight percent 3-ABOAB (curing agent).

Another exemplary uncured resin is composed of from 21 to 27 weight percent triglycidyl-p-aminophenol (trifunctional epoxy resin); from 21 to 27 weight percent difunctional epoxy resin; from 9 to 14 weight percent polyethersulfone (soluble thermoplastic); from 5 to 15 weight percent polyamide particles (insoluble thermoplastic particle); and from 25 to 35 weight percent 3-ABOAB (curing agent). A preferred uncured resin is composed of from 23 to 25 weight percent triglycidyl-p-aminophenol (trifunctional epoxy resin); from 23 to 25 weight percent difunctional epoxy resin; from 10 to 12 weight percent polyethersulfone (soluble thermoplastic); from 5 to 8 weight percent PA 12 polyamide particles; from 3 to 6 weight percent PA 11 particles; and from 28 to 32 weight percent 3-ABOAB (curing agent).

Another exemplary uncured resin is composed of from 20 to 27 weight percent triglycidyl-m-aminophenol (trifunctional epoxy resin); from 8 to 12 weight percent tetrafunctional epoxy resin; from 14 to 18 weight percent difunctional epoxy; from 12 to 16 weight percent polyethersulfone (soluble thermoplastic); from 5 to 15 weight percent polyamide particles (insoluble thermoplastic particle); and from 20 to 30 weight percent 3-ABOAB (curing agent). Preferably, the polyamide particles are a mixture of Nylon-12 particles (SP10L) and Nylon-11 particles (Rilsan11). A preferred uncured resin is composed of from 22 to 26 weight percent triglycidyl-m-aminophenol (trifunctional epoxy resin); from 9 to 11 weight percent tetrafunctional epoxy resin; from 15 to 17 weight percent difunctional epoxy; from 13 to 16 weight percent polyethersulfone (soluble thermoplastic); from 5 to 8 weight percent PA 12 polyamide particles; from 3 to 6 weight percent PA 11 particles; and from 33 to 37 weight percent 3-ABOAB (curing agent).

The prepreg may be molded using any of the standard techniques used to form composite parts. Typically, one or more layers of prepreg are place in a suitable mold and cured to form the final composite part. The prepreg of the invention may be fully or partially cured using any suitable temperature, pressure, and time conditions known in the art. Typically, the prepreg will be cured in an autoclave at temperatures of between 165° C. and 190° C. with curing temperatures on the order of 175° C. and 180° C. being preferred. The uncured composite material may also be cured using a method selected from UV-visible radiation, microwave radiation, electron beam, gamma radiation, or other suitable thermal or non-thermal radiation.

Composite parts made from the improved prepreg of the present invention will find application in making articles such as numerous primary and secondary aerospace structures (wings, fuselages, bulkheads and the like), but will also be useful for other high performance structural applications in the automotive, rail, marine and energy industries where high tensile strength, compressive strength, interlaminar fracture toughness and resistance to impact damage are needed.

It was discovered that the 3-ABOAB-cured resins in accordance with the present invention are relatively unreactive at room temperature while still being suitable for curing according to conventional curing processes for thermoplastic toughened epoxy resins.

The term "uncured", when used herein in connection with prepreg, matrix resin or composite material, is intended to cover resins that have not undergone any substantial curing reaction, such as B-staging, or other partial curing processes. For example, after storage at room temperature for any given period of time, a resin is considered to be uncured if the extent of reaction (a) of the resin is less than 5%. The extent of reaction is also referred to as the "degree of reaction". The extent of reaction of a resin is determined by using differential scanning calorimty (DSC) to determine the heat release ($\Delta H_O$) of the resin immediately after preparation (time=0) and then determining the residual heat release ($\Delta H_R$) after a certain time of exposure at room temperature. The extent of reaction is calculated as $\alpha=(1-\Delta H_R/\Delta H_O)\times 100$. According to the invention, an out-time or shelf-life of 6 weeks at room temperature means that the uncured resin remains uncured after storage at room temperature for 6 weeks such that the extent of reaction is less than 5%. The ter "fully cured" means that the extent of reaction is over 95%.

For the purposes of this specification, room temperature is considered to be any temperature between 15° C. and 24° C. Typically, the uncured resin will be stored at temperatures of between 18° C. and 24° C.

In order that the present invention may be more readily understood, reference will now be made to the following examples of the invention.

Example 1

An exemplary uncured resin formulation in accordance with the present invention is set forth in TABLE 1. An uncured resin was prepared by mixing the epoxy resin ingredient at room temperature (22° C.) with 3-ABOAB as the curing agent. The two ingredients were mixed in thoroughly to form the uncured resin.

TABLE 1

| 1 (Wt %) | Ingredient |
| --- | --- |
| 58.26 | Trifunctional metal-glycidyl amine (MY0600) |
| 41.74 | [3-(4-aminobenzoyl) oxyphenyl] 4-aminobenzoate (3-ABOAB)(1,3-pBABB) |

The uncured resin had a viscosity that was suitable for use in making, prepreg. When impregnated into a fiber reinforcement, the resulting prepreg will have tack properties that are acceptable for use in forming, articles for molding. Exemplary prepreg can be prepared by impregnating one or more layers of unidirectional carbon fibers with the resin formulation of TABLE 1. The unidirectional carbon fibers are used to make a prepreg m which the matrix resin amounts to about 35 weight percent of the total uncured prepreg weight and the fiber areal weight is about 190 grams per square meter (gsm). A variety of prepreg lay ups can be prepared using standard prepreg fabrication procedures. The prepregs are cured in an autoclave at 180° C. for about 2 hours and are expected to have the strength and damage tolerance that is suitable for use in aerospace primary structures.

Differential Scanning Calorimetry (DSC) was conducted on the resin formulation of TABLE 1 in order to determine the extent of reaction after the resin was stored at room temperature (22° C.) for 6 weeks. The DSC testing was conducted on the initially prepared resin to determine $\Delta H_O$. $\Delta H_R$ was determined after storage at room temperature for 6 weeks. The DSC testing was conducted on 5 mg resin samples using a TA Instruments Q2000 calorimeter. DSC testing was performed over a temperature range of −60° C. to 350° C. at a ramp rate of 10° C. per minute. The uncured resin remained uncured for the 6 week duration of the test. The extent of reaction of the resin after the 6 week period was less than 5%. After the 6-week test period, the uncured resin sample was cured at 177° C. for 2 hours at atmospheric pressure. The extent of reactivity after curing was greater than 95% which indicates that the resin was fully cured.

Example 2

Another exemplary resin formulation in accordance with the present invention is set forth in TABLE 2. The uncured resin was prepared by mixing the epoxy ingredient at room temperature with the polyethersulfone to form a resin blend that was heated to 120° C. for 60 minutes to completely dissolve the polyethersulfone. The mixture was cooled to 80° C. and the rest of the ingredients (polyamide particles and 3-ABOAB curing agent) were added and mixed in thoroughly to form the uncured resin.

TABLE 2

| 2 (Wt %) | Ingredient |
| --- | --- |
| 41.94 | Trifunctional meta-glycidyl amine (MY0610) |
| 12.20 | Polyethersulfone (Sumikaexcel 5003P)) |
| 6.25 | Polyamide 12 particles (SP10L) |
| 4.75 | Polyamide 11 particles (Rilsan PA11) |
| 34.9 | [3-(4-aminobenzoyl) oxyphenyl] 4-aminobenzoate (3-ABOAB) (1,3-pBABB) |

The resin formulation was tested using the same DSC test procedure as Example 1. After 6 weeks, the extent of reactivity of the uncured resin was essentially 0%. After curing at 177° C. for 2 hours at atmospheric pressure, the extent of reactivity was above 95% which confirmed that the resin had been fully cured. The uncured resins had a viscosity that was suitable for use in making prepreg. When impregnated into a fiber reinforcement, the resulting prepreg will have tack properties that are acceptable for use in forming articles for molding. Exemplary prepreg can be prepared by impregnating one or more layers of unidirectional carbon fibers with the resin formulations of TABLE 2. The unidirectional carbon fibers are used to make a prepreg in which the matrix resin amounts to about 35 weight percent of the total uncured prepreg weight and the fiber areal weight is about 190 grams per square meter (gsm). A variety of prepreg lay ups can be prepared using standard prepreg fabrication procedures. The prepregs are cured in an autoclave at 180° C. for about 2 hours and are expected to have the strength and damage tolerance that is suitable for use in aerospace primary structures.

Example 3

Another exemplary resin formulation in accordance with the present invention is set forth in TABLE 3. Uncured resin was prepared by mixing the epoxy ingredients at room temperature with the polyethersulfone (PES) to form a resin blend that was heated to 120° C. for 60 minutes to completely dissolve the PES. The mixture was cooled to 80° C. and the polyamide particles and 3-ABOAB curing agent were added and mixed in thoroughly to form the uncured resin.

TABLE 3

| 3 (Wt %) | Ingredient |
|---|---|
| 23.86 | Trifunctional para-glycidyl amine (MY0510) |
| 23.86 | Difunctional epoxy (Bisphenol F) (GY282) |
| 11.3 | Polyethersulfone (Sumikaexcel 5003P) |
| 6.25 | Polyamide 12 particles (SP10L) |
| 4.75 | Polyamide 11 particles (Rilsan PA11) |
| 30.00 | [3-(4-aminobenzoyl) oxyphenyl] 4-aminobenzoate (3-ABOAB) (1,3-pBABB) |

The resin formulation was tested using the same DSC test procedure as Example 1. After 6 weeks, the extent of reactivity of the uncured resin was essentially 0%. After curing at 177° C. for 2 hours at atmospheric pressure, the extent of reactivity was above 95%. The uncured resin had a viscosity that was suitable for use in making prepreg. When impregnated into a fiber reinforcement, the resulting prepreg will have tack properties that are acceptable for use in forming articles for molding. Exemplary prepreg can be prepared by impregnating one or more layers of unidirectional carbon fibers with the resin formulations of TABLE 3. The unidirectional carbon fibers are used to make a prepreg in which the matrix resin amounts to about 35 weight percent of the total uncured prepreg weight and the fiber areal weight is about 190 grams per square meter (gsm). A variety of prepreg lay ups can be prepared using standard prepreg fabrication procedures. The prepregs are cured in an autoclave at 180° C. for about 2 hours and are expected to have the strength and damage tolerance that is suitable for use in aerospace primary structures.

Example 4

Another exemplary resin formulation in accordance with the present invention is set forth in TABLE 4. Uncured resin was prepared by mixing the epoxy ingredients at room temperature with the polyethersulfone (PES) to form a resin blend that was heated to 120° C. for 60 minutes to completely dissolve the PES. The mixture was cooled to 80° C. and the polyamide particles and 3-ABOAB curing agent were added and mixed in thoroughly to form the uncured resin.

TABLE 4

| 1 (Wt %) | Ingredient |
|---|---|
| 23.84 | Trifunctional metal-glycidyl amine (MY0600) |
| 10.00 | Tetrafunctional para-glycidyl amine (MY721) |
| 15.77 | Difunctional epoxy (Bisphenol F) (GY285) |

TABLE 4-continued

| 1 (Wt %) | Ingredient |
|---|---|
| 14.30 | Polyethersulfone (Sumikaexcel 5003P) |
| 6.25 | Polyamide 12 particles (SP10L) |
| 4.75 | Polyamide 11 particles (Rilsan 11) |
| 25.12 | [3-(4-aminobenzoyl) oxyphenyl] 4-aminobenzoate (3-ABOAB) (1,3-pBABB) |

The resin formulation was tested using the same DSC test procedure as Example 1. Alter 6 weeks, the extent of reactivity of the uncured resin was essentially 0%. Alter curing at 177° C. for 2 hours at atmospheric pressure, the extent of reactivity was above 95%. The uncured resin had a viscosity that was suitable for use in making prepreg. When impregnated into a fiber reinforcement, the resulting prepreg will have tack properties that are acceptable for use in forming articles for molding. Exemplary prepreg can be prepared by impregnating one or more layers of unidirectional carbon fibers with the resin formulations of TABLE 3. The unidirectional carbon fibers are used to make a prepreg in which the matrix resin amounts to about 35 weight percent of the total uncured prepreg weight and the fiber areal weight is about 190 grams per square meter (gsm). A variety of prepreg lay ups can be prepared using standard prepreg fabrication procedures. The prepregs are cured in an autoclave at 180° C. for about 2 hours and are expected to have the strength and damage tolerance that is suitable for use in aerospace primary structures.

Comparative Example 1

A comparative resin formulation is set forth in TABLE 5. The resin formulation is the same as Example 4, except that 3,3'-DDS is used as the curative. Uncured resin was prepared by mixing the epoxy ingredients at room temperature with the polyethersulfone (PES) to form a resin blend that was heated to 120° C. for 60 minutes to completely dissolve the PES. The mixture was cooled to 80° C. and the polyamide particles and 3,3'-DDS curing agent were added and mixed in thoroughly to form the uncured resin.

TABLE 5

| 1 (Wt %) | Ingredient |
|---|---|
| 25.72 | Trifunctional metal-glycidyl amine (MY0600) |
| 10.29 | Tetrafunctional para-glycidyl amine (MY721) |
| 17.01 | Difunctional epoxy (Bisphenol F) (GY285) |
| 15.43 | Polyethersulfone (Sumikaexcel 5003P) |
| 6.25 | Polyamide 12 particles (SP10L) |
| 4.75 | Polyamide 11 particles (Rilsan 11) |
| 20.55 | 3,3'-DDS |

The resin formulation was tested using the same DSC test procedure as Example 1. After 6 weeks, the extent of reactivity of the uncured resin was over 30%. After curing at 177° C. for 2 hours at atmospheric pressure, the extent of reactivity was above 95%.

Isomer Comparisons

3-ABOAB (1,3-pBABB) and two isomers were blended with the MY 0610 epoxy resin in the following proportions:
1) 29.1 g of 1,3-pBABB with 30.9 g of MY0610 mixed at 100° C.;

2) 6.28 g of 1,3-mBABB with 6.66 g of MY0610 mixed at 60° C.; and
3) 28.3 g of 1,2-pBABB with 30.0 g of MY0610 mixed at 120° C.

The above formulations were cured by heating for one hour at 130° C. and then for two hours at 180° C.

Dynamic scanning calorimetry (DSC) was performed using a TA Q100 instrument to determine onset temperatures, enthalpy and residual cure using a heating, rate of 10° C./minute (for onset and enthalpy.)

Dynamic mechanical analysis (DMA) was performed using a TA Q800 instillment on cured resin to determine glass transition temperatures at a heating rate of 5° C./min and at a frequency of 1 Hz to provide E' Tg and wet E' Tg.

Hot/wet resistance was determined of the neat resin by immersing cured DMA specimens in a water bath for two weeks at 70° C. Water uptake and Tg were then determined (for conditioning samples for wet Tg).

Compression modulus was performed using an Instron mechanical test machine on neat resin cylinders (6 cm long 1-1.5 cm in diameter) that were machined to parallel ends (for neat resin modulus).

The results are shown in TABLE 6.

TABLE 6

| Para Amino Benzoate | Onset of cure (° C.) | En-thalpy (J/g) | E'Tg (° C.) | Wet Tg (° C.) | Water uptake (%) | Compression Modulus (GPa) |
|---|---|---|---|---|---|---|
| 1,3-pBABB | 165 | 594 | 200 | 136 | 3.13 | 4.10 |
| 1,3-mBABB | 152 | 556 | 180 | 132 | 2.62 | 4.42 |
| 1,2-pBABB | 174 | 521 | 200 | 123 | 3.16 | 4.14 |

3-ABOAB (1,3-pBABB) and various isomers were dispersed in a 1:1 stoichiometry in MY 0610 epoxy resin and cured by heating for one hour at 130° C. and then for two hours at 180° C. Tests were conducted as described above. The results are set forth in TABLE 7.

TABLE 7

| Amine | Onset of cure (° C.) | En-thalpy (J/g) | E' Tg (° C.) | Wet Tg (° C.) | Water uptake (%) | Compression Modulus (GPa) |
|---|---|---|---|---|---|---|
| 1,3-pBABB | 165 | 594 | 200 | 136 | 3.13 | 4.10 |
| 1,3-mBABB | 152 | 556 | 180 | 132 | 2.62 | 4.42 |
| 1,2-pBABB | 174 | 521 | 200 | 123 | 3.16 | 4.14 |
| 1,4-pBABB | 210 | 553 | n/a | n/a | n/a | n/a |

Having thus described exemplary embodiments of the present invention, it should be noted by those skilled in the art that the within disclosures are exemplary only and that various other alternatives, adaptations and modifications may be made within the scope of the present invention. Accordingly, the present invention is not limited by the above-described embodiments, but is only limited by the following claims.

What is claimed is:

1. A prepreg which can be stored at room temperature for at least 6 weeks and which can be fully cured in no more than 2 hours at a temperature of between 165° C. and 190° C., said prepreg comprising:
a fiber reinforcement;
an uncured resin comprising:
an epoxy resin component comprising a trifunctional epoxy resin selected from the group consisting of triglycidyl-m-aminophenol and triglycidyl-p-aminophenol; and
a curing agent comprising a sufficient amount of [3-(4-aminobenzoyl) oxyphenyl]4-aminobenzoate such that the stoichiometric ratio between said epoxy resin component and said curing agent is between 0.65:1 and 1.1:0.8 and wherein said uncured resin can be stored at room temperature for at least 6 weeks and wherein said prepreg can be fully cured in no more than 2 hours at a temperature of between 165° C. and 190° C.

2. A prepreg according to claim 1 wherein said epoxy resin component additionally comprises diglycidyl ether of bisphenol F.

3. A prepreg according to claim 2 wherein said epoxy resin component additionally comprises N,N,N',N'-tetraglycidyl-4,4'-diaminodiphenyl methane.

4. A prepreg according to claim 1 wherein the said uncured resin comprises a soluble thermoplastic and insoluble thermoplastic particles.

5. A prepreg according to claim 4 wherein said soluble thermoplastic comprises polyethersulfone.

6. A prepreg according to claim 5 wherein said insoluble thermoplastic particles comprise polyamide particles.

7. A prepreg according to claim 1 wherein said epoxy resin component consists of triglycidyl-m-aminophenol and wherein the stoichiometric ratio between said triglycidyl-m-aminophenol and said curing agent is between 0.7:1 and 0.95:1.

8. A prepreg according to claim 7 wherein the said uncured resin comprises a soluble thermoplastic and insoluble thermoplastic particles.

9. A prepreg according to claim 8 wherein said soluble thermoplastic comprises polyethersulfone.

10. A prepreg according to claim 9 wherein said insoluble thermoplastic particles comprise polyamide particles.

11. A prepreg according to claim 2 wherein the said uncured resin comprises a soluble thermoplastic and insoluble thermoplastic particles.

12. A prepreg according to claim 11 wherein said soluble thermoplastic comprises polyethersulfone.

13. A prepreg according to claim 12 wherein said insoluble thermoplastic particles comprise polyamide particles.

14. A prepreg according to claim 3 wherein the said uncured resin comprises a soluble thermoplastic and insoluble thermoplastic particles.

15. A prepreg according to claim 14 wherein said soluble thermoplastic comprises polyethersulfone.

16. A prepreg according to claim 15 wherein said insoluble thermoplastic particles comprise polyamide particles.

17. A composite material comprising a prepreg according to claim 1 which has been cured.

18. A composite material according to claim 17 wherein said composite material forms at least part of a primary structure of an aircraft.

19. A method for making a prepreg which can be stored at room temperature for at least 6 weeks and which can be fully cured in no more than 2 hours at a temperature of between 165° C. and 190° C., said method comprising the steps of:
providing an uncured resin which can be stored at room temperature for at least 6 weeks and which can be fully cured in no more than 2 hours at a temperature of between 165° C. and 190° C., said uncured resin comprising:
an epoxy resin component comprising a bifunctional epoxy resin selected from the group consisting of triglycidyl-m-aminophenol and triglycidyl-p-aminophenol;

a curing agent comprising a sufficient amount of [3-(4-aminobenzoyl) oxyphenyl]4-aminobenzoate such that the stoichiometric ratio between said epoxy resin component and said curing agent is between 0.65:1 and 1.1:0.8 and wherein said uncured resin can be stored at room temperature for at least 6 weeks and wherein said uncured resin can be fully cured in no more than 2 hours at a temperature of between 165° C. and 190° C.; and combining said uncured resin with a fibrous reinforcement to provide said prepreg.

20. A method for storing an uncured resin at room temperature for up to six weeks or more, said method comprising the steps of:

A) providing an uncured resin which can be stored at room temperature for at least 6 weeks and which can be fully cured in no more than 2 hours at a temperature of between 165° C. and 190° C., said uncured resin comprising:
   a) an epoxy resin component comprising a bifunctional epoxy selected from the group consisting of triglycidyl-m-aminophenol and triglycidyl-p-aminophenol;
   b) a curing agent comprising a sufficient a count of [3-(4-aminobenzoyl) oxyphenyl]4-aminobenzoate such that the stoichiometric ratio between said epoxy resin component and said curing agent is between 0.651 and 1.1:0.8 and wherein said uncured resin can be stored at room temperature of at least 6 weeks and wherein said uncured resin can be fully cured in no more than 2 hours at a temperature of between 165° C. and 190° C.; and B) storing said uncured resin for up to 6 weeks or more at room temperature.

* * * * *